(12) United States Patent
Glover

(10) Patent No.: US 10,332,184 B2
(45) Date of Patent: Jun. 25, 2019

(54) PERSONALIZED APPLICATION RECOMMENDATIONS

(71) Applicant: Samsung Electronics Co., Ltd., Suwon-si, Gyeonggi-do (KR)

(72) Inventor: Eric Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/571,110

(22) Filed: Dec. 15, 2014

(65) Prior Publication Data
US 2016/0171589 A1 Jun. 16, 2016

(51) Int. Cl.
*G06Q 30/06* (2012.01)

(52) U.S. Cl.
CPC .................. *G06Q 30/0631* (2013.01)

(58) Field of Classification Search
None
See application file for complete search history.

(56) References Cited

U.S. PATENT DOCUMENTS

| | | | |
|---|---|---|---|
| 8,452,797 B1 | 5/2013 | Paleja et al. | |
| 8,478,664 B1* | 7/2013 | Xavier | G06Q 30/00 705/26.1 |
| 8,499,063 B1* | 7/2013 | Satish | G06F 8/62 709/220 |
| 2005/0120311 A1 | 6/2005 | Thrall | |
| 2011/0307354 A1* | 12/2011 | Erman et al. | 705/27.1 |
| 2011/0320307 A1* | 12/2011 | Mehta | G06Q 30/0282 705/26.7 |
| 2012/0096013 A1* | 4/2012 | Ciancutti | G06F 17/30029 707/749 |

(Continued)

OTHER PUBLICATIONS

Kim, Ryan, Sep. 10, 2009. ITunes' Genius helps Apple mobile users find more apps. San Francisco Chronicle, C4. ISSN 1932-8672.*

(Continued)

*Primary Examiner* — Jason B Dunham
*Assistant Examiner* — Brittany E Bargeon
(74) *Attorney, Agent, or Firm* — Jefferson IP Law, LLP

(57) ABSTRACT

An example system includes a recommendation module. The recommendation module may receive a recommendation request including a set of installed application identifiers and identify a set of candidate application groups including at least one matching candidate application identifier. For each candidate application group, the recommendation module may determine a recommendation score based on a number of matching candidate application identifiers included in the candidate application group that match at least one installed application identifier. The recommendation module may select a first candidate application group based on the recommendation scores and select at least one non-matching candidate application identifier from the first candidate application group that does not match any of the installed application identifiers, resulting in a set of recommended application identifiers. The recommendation module may transmit to the user device, recommendation data for at least one recommended application identified by the set of recommended application identifiers.

18 Claims, 7 Drawing Sheets

(56) References Cited

U.S. PATENT DOCUMENTS

| | | | | |
|---|---|---|---|---|
| 2012/0116905 A1* | 5/2012 | Futty | ................... | G06Q 30/0282 |
| | | | | 705/26.1 |
| 2012/0143677 A1* | 6/2012 | Bruno et al. | ............... | 705/14.46 |
| 2012/0191536 A1* | 7/2012 | Chen et al. | ................. | 705/14.49 |
| 2012/0291022 A1* | 11/2012 | Mehta | ....................... | G06F 8/60 |
| | | | | 717/176 |
| 2013/0132896 A1* | 5/2013 | Lee et al. | ...................... | 715/808 |
| 2013/0185292 A1* | 7/2013 | Li | ..................... | G06F 17/30522 |
| | | | | 707/723 |
| 2013/0290369 A1* | 10/2013 | Sayers et al. | ................. | 707/769 |
| 2013/0325856 A1* | 12/2013 | Soto Matamala et al. | ... | 707/724 |
| 2013/0326499 A1* | 12/2013 | Mowatt et al. | ............... | 717/177 |
| 2014/0344103 A1* | 11/2014 | Zhu | ................... | G06Q 30/0631 |
| | | | | 705/26.7 |
| 2016/0124959 A1* | 5/2016 | Ning | ................. | G06F 16/24578 |
| | | | | 707/751 |

OTHER PUBLICATIONS

Kim, Ryan, ITunes' Genius Helps Apple Mobile Users Find More Apps, Sep. 10, 2009. San Francisco Chronicle, C4. ISSN 1932-8672. (Year: 2009).*

International Application No. PCT/US2014/070411, International Search Report and Written Opinion dated Mar. 18, 2015.

* cited by examiner

PERSONALIZED APPLICATION RECOMMENDATIONS

TECHNICAL FIELD

The present disclosure generally relates to providing application recommendations to one or more users, and more particularly, to techniques for providing personalized application recommendations to one or more users.

BACKGROUND

The installation and use of applications on different user devices is becoming increasingly common. Many users discover applications to download from a myriad of sources. In order to download or learn about an application, however, the user is often required to be aware of and be able to identify the desired application (e.g., by name). As a result, application discovery by users may be a result of happenstance. Some users learn about an application only if they stumble upon a news article, receive a recommendation from a digital distribution platform (e.g., GOOGLE PLAY STORE), listen to technology podcasts, or encounter advertising (e.g., on digital distribution platforms, TV, radio, or the like). Other users may have friends who occasionally discuss and suggest applications. Many users, however, would install and utilize applications if they were aware of the different applications available.

SUMMARY

In various implementations, a system includes a recommendation module. The recommendation module may receive a recommendation request for at least one recommended application, the recommendation request including a set of installed application identifiers that identify a set of applications that are installed on a user device, identify, from the set of installed application identifiers, a set of candidate application groups from a plurality of available application groups, each candidate application group of the set of candidate application groups including at least one matching candidate application identifier that matches at least one installed application identifier from the set of installed application identifiers, for each candidate application group of the plurality of candidate application groups, determine a recommendation score based, at least in part, on a number of matching candidate application identifiers included in the candidate application group that match at least one installed application identifier from the set of installed application identifiers, select a first candidate application group from the set of candidate application groups based on the recommendation score of the first candidate application group, and select at least one non-matching candidate application identifier from the first candidate application group that does not match any of the installed application identifiers of the set of installed application identifiers, resulting in a set of recommended application identifiers, and transmit to the user device, recommendation data for at least one recommended application identified by the set of recommended application identifiers.

Some aspects of the disclosure provide a method comprising receiving a recommendation request for at least one recommended application, the recommendation request including a set of installed application identifiers that identify a set of applications that are installed on a user device, identifying, from the set of installed application identifiers, a set of candidate application groups from a plurality of available application groups, each candidate application group of the set of candidate application groups including at least one matching candidate application identifier that matches at least one installed application identifier from the set of installed application identifiers, for each candidate application group of the plurality of candidate application groups, determining a recommendation score based, at least in part, on a number of matching candidate application identifiers included in the candidate application group that match at least one installed application identifier from the set of installed application identifiers, selecting a first candidate application group from the set of candidate application groups based on the recommendation score of the first candidate application group; and selecting at least one non-matching candidate application identifier from the first candidate application group that does not match any of the installed application identifiers of the set of installed application identifiers, resulting in a set of recommended application identifiers, and transmitting to the user device, recommendation data for at least one recommended application identified by the set of recommended application identifiers.

Further, some aspects of the disclosure provide a system including non-transitive memory comprising executable instructions. The instructions may be executable by a data processing device to perform a method. The method may comprise receiving a recommendation request for at least one recommended application, the recommendation request including a set of installed application identifiers that identify a set of applications that are installed on a user device, identifying, from the set of installed application identifiers, a set of candidate application groups from a plurality of available application groups, each candidate application group of the set of candidate application groups including at least one matching candidate application identifier that matches at least one installed application identifier from the set of installed application identifiers, for each candidate application group of the plurality of candidate application groups, determining a recommendation score based, at least in part, on a number of matching candidate application identifiers included in the candidate application group that match at least one installed application identifier from the set of installed application identifiers, selecting a first candidate application group from the set of candidate application groups based on the recommendation score of the first candidate application group; and selecting at least one non-matching candidate application identifier from the first candidate application group that does not match any of the installed application identifiers of the set of installed application identifiers, resulting in a set of recommended application identifiers, and transmitting to the user device, recommendation data for at least one recommended application identified by the set of recommended application identifiers.

BRIEF DESCRIPTION OF THE DRAWINGS

Like reference symbols in the various drawings indicate like elements.

DETAILED DESCRIPTION

Figure 1:
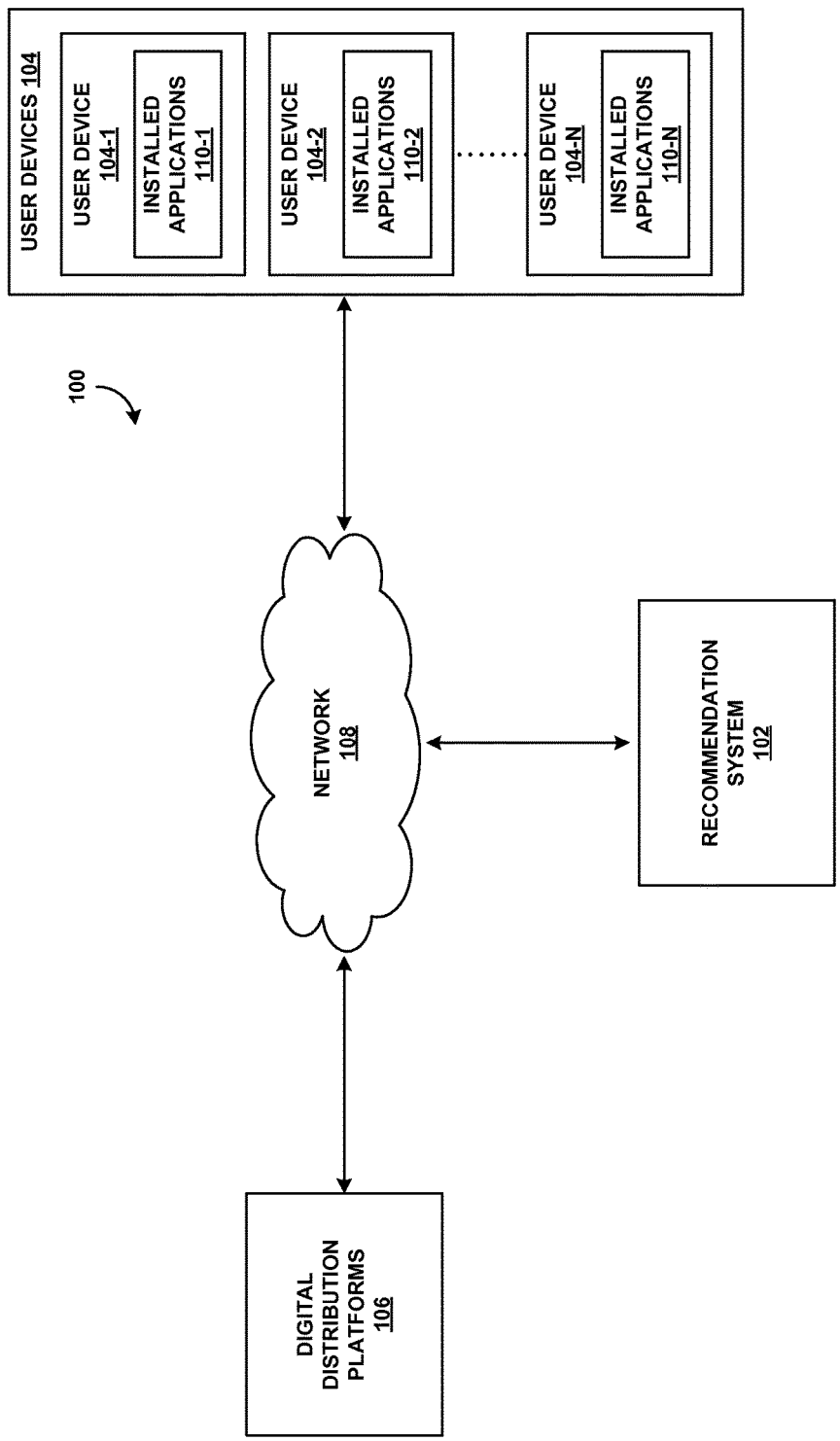
FIG. 1 shows an environment including a recommendation system, user devices, and digital distribution platforms in communication over a network in some embodiments.

A recommendation system may provide personalized application recommendations to a user. An application may refer to a package of computer software developed to be executed on a computing device platform that causes a computing device to provide one or more functions. In some examples, a software application may be referred to as an "application," an "app," or a "program." An application recommendation may include recommendation information that identifies a recommended application and/or enables the user to access the recommended application. For example, recommendation data may include a name, description, ratings, and/or developer of the recommended application. The recommendation data may also include interactive elements (e.g., links) to enable the user to download, purchase, or learn more about (e.g., preview) the recommended application.

The recommendation system may receive a recommendation request and a list of installed applications (i.e., installed application information). The recommendation request is a request for personalized application recommendations and may include a user device identifier and/or a user identifier. The recommendation request may be provided from a user's device (e.g., a digital device that provided the recommendation request). The installed application information that identifies any number of applications (e.g., application identifiers) installed on the user's device. An application identifier may include a name of an application or any other indication (e.g., code, descriptors, or the like) which may identify one or more applications.

The recommendation system may provide personalized application recommendations using predetermined application groups (i.e., groups of identified applications). An application group is a set of two or more related applications. Applications may be related in any number of ways. For example, two or more applications may be related based on popularity (e.g., as indicated by a digital distribution platform such as GOOGLE PLAY), application type (e.g., two or more applications that are games, social media applications, productivity applications, or communication applications), description (e.g., tags associated with the two or more applications as indicated on a digital distribution platform such as GOOGLE PLAY), and/or the like.

In some embodiments, the recommendation system may analyze the list of installed applications associated with the user and/or user's device to identify one or more application groups as candidate application groups from which to recommend applications to the user. The recommendation system may identify candidate application groups using the list of installed applications. In one example, the recommendation system may identify candidate application groups as those application groups that include one or more of the identified applications installed on the user's device.

The recommendation system may select any number of applications identified in the candidate application groups and that are not currently installed on the user's device (e.g., using the installed application information). The selected applications may be recommended to a user and/or a user's device as recommended applications. For example, the recommendation system may provide an application recommendation including recommendation data that describes the selected application(s). The recommendation data may also include interactive elements (e.g., links) to enable the user to download, purchase, or learn more about (e.g., preview) the selected application(s).

The recommendation system may identify any number of candidate application groups. In various embodiments, the recommendation system may select a subset of candidate application groups using recommendation scores. The recommendation system may subsequently select applications to recommend that are members of the selected candidate application groups. In one example, the recommendation system may generate and/or assign a score to a candidate application group based on the number of applications that are members of the candidate application group that are also identified as an application installed on the user's device (e.g., identified by the application installation information). Those candidate application groups that have more member applications that are also installed on the user's device may be scored differently (e.g., higher) than other candidate application groups. In some embodiments, the recommendation system may select candidate application groups with the highest score. The recommendation system may select one or more applications from the selected candidate application groups to recommend to the user and/or user's device (e.g., as recommendation data).

It will be appreciated that candidate application groups may be scored and/or selected in any number of ways. Similarly, it will be appreciated that applications from one or more of the candidate application groups (e.g., selected candidate application groups) may be selected as recommended applications in any number of ways.

FIG. 1 shows an environment 100 including a recommendation system 102, user devices 104, and digital distribution platforms 106 in communication over a network 108 in some embodiments. As illustrated, multiple computing devices may be connected to a network 108 and be configured to communicate with each other through use of the network 108. The network 108 may be any type of network, including but not limited to a local area network ("LAN"), such as an intranet, a wide area network ("WAN"), such as the Internet, or any combination thereof. Further, the network 108 may be a public network, a private network, or a combination thereof. The network 108 may also be implemented using any number of communications links associated with one or more service providers, including one or more wired communication links, one or more wireless communication links, or any combination thereof. Additionally, the network 108 may be configured to support the transmission of data formatted using any number of protocols.

Multiple computing devices may be connected to network 108. A computing device may be any type of general computing device (e.g., a device with a processor and memory) capable of network communication with other computing devices. For example, a computing device may be a personal computing device such as a desktop or workstation, a business server, or a portable computing device, such as a laptop, smart phone, or a tablet PC. A computing device may include some or all of the features, components, and peripherals of the digital device 600 of FIG. 6. To facilitate communication with other computing devices, a computing device may also include a communication interface configured to receive a communication, such as a request, data, or the like, from another computing device in network communication and pass the communication along to an appropriate module running on the computing device. The communication interface may also be configured to send a communication to another computing device in network communication with the computing device.

The recommendation system 102, user devices 104 and digital distribution platforms 106 may each include or be any number of more computing devices. In some embodiments, the recommendation system 102 recommends applications to a user or user device (e.g., any number of the user devices 104) to enable the user to download or receive information regarding any or all of the recommended applications. The recommendation system 102 may receive a recommendation request from a user device 104-1 and transmit recommendation data to the user device 104-1 recommending one or more applications.

Recommendation data may be, for example, data describing any number of recommended application(s) and/or enabling the user device 104-1 to access the recommended application(s). Accessing an application may include purchasing, executing, downloading, streaming, and/or learning more about the application. In some embodiments, recommendation data may include the name, description, images, ratings, reviews, developer, price, or the like, of the recommended application, as well as interactive elements, such as links, that enable a user to download, purchase, learn more about, preview, or otherwise access the recommended application.

The digital distribution platforms 106 may be configured to distribute applications and/or otherwise provide information regarding downloadable applications to the user devices 104. Example digital distribution platforms 106 include, but are not limited to, GOOGLE PLAY® developed by GOOGLE INC., the APP STORE® developed by APPLE INC., and WINDOWS PHONE STORE® developed by MICROSOFT CORPORATION. Applications recommended by the recommendation system 102 may be downloadable or otherwise accessible from the digital distribution platforms 106. User devices 104 may use the recommendation data provided by the recommendation system 102 to access the recommended applications from the digital distribution platforms 106. For example, a link provided in an application recommendation may, upon selection, cause the user device 104-1 to communicate with the digital distribution platforms 106 to access the recommended application.

An installed application 110 (e.g., application 110-1) may refer to any application (e.g., a package of computer software developed to be executed on a computing device platform that causes a computing device to provide one or more functions) that is installed on the user device. Example applications 110-1 may include, but are not limited to, word processing applications, spreadsheet applications, messaging applications, media streaming applications, social networking applications, communication applications, and gaming applications.

Installed applications 110 may be executed on a variety of different computing devices (e.g., user devices 104-1 . . . 104-N). For example, some installed applications 110 may be executed on mobile computing devices such as smart phones, tablets, and wearable computing devices (e.g., headsets and/or watches). Installed applications 110 may also be executed on other types of computing devices having other form factors such as laptop computers, desktop computers, or other consumer electronic devices. In some examples, installed applications 110 may be installed on a computing device prior to a user purchasing the computing device. In other examples, the user may have downloaded and installed the installed applications 110 on the user device 104.

Functionality of the installed applications 110 may be accessed on the user device 104 on which the installed applications 110 are installed. These installed applications 110 may function without communication with other computing devices (e.g., without communicating over the Internet).

Some installed applications 110 installed on a user device 104 may access information from other remote computing devices during operation. For example, a weather application installed on a user device 104 may access the latest weather information via the Internet (e.g., via network 108) and display the accessed weather information to the user through the installed weather application.

Each user device 104 includes "installed applications 110" that represent applications installed on the user device. For example, each user device 104-1 . . . 104-N may include installed applications 110-1 . . . 110-N, respectively.

User devices 104 may communicate with the recommendation system 102 via the network 108. In some examples, a user device 104 may communicate with the recommendation system 102 using an application (e.g., a native application) installed on the user device 104. For example, a user device 104 may execute an application that is dedicated to interfacing with the recommendation system 102 such as recommendation system specific client-side application. In some embodiments, a user device 104 may communicate with the recommendation system 102 using a more general application, such as a Web browser application, email application, text application, and/or the like. In some embodiments, an application run by a user device 104 to communicate with the recommendation system 102 may provide a graphical user interface (GUI) enabling the user to request and/or receive an application recommendation, for example, using a touchscreen or physical keyboard, a speech-to-text program, or any other form of user input.

Examples of the user device 104-1 providing information and/or recommendation requests to the recommendation system and receiving application recommendations from the recommendation system 102 are described herein. Further, examples of the recommendation system 102 selecting applications to recommend to the user are also described herein.

The environment 100 may further comprise, in some embodiments, a search system (not depicted). The search system may include any number of computing device and be configured to receive a search query and provide search results to the user and/or user device. In some embodiments, a user device (e.g., user device 104-1) may provide a search query and/or a recommendation request. The recommendation system 102 may provide the recommendation data within the search results provided by the search system.

A search query may be a request for information retrieval (e.g., search results) from the search system. For example, a search query may be directed to retrieve a list of application names. A search query directed to retrieve a list of application names may indicate a user's desire to access functionality of one or more applications described by the search query.

In some embodiments, the search system receives a search query from a user device 104-1. The search query may include a request to find any number of applications. The search system may use information from the search query to find one or more applications and generate search results (e.g., including links to download applications identified in the search results). The search results may include application recommendation(s) generated by the recommendation system 102.

In one example, the search system may receive the search query and generate a search result set, such as a list, based on the data from an application record data store. For example, the search system may generate a search result set based on the search query and records stored in the application record data store (e.g., utilizing all or part of the search query to retrieve information from any number of records). The search system may transmit the search result set (e.g., a set of application identifiers identified as result of the search) to the user device 104 (e.g., user device 104-1) that transmitted the search query and/or any other device.

In some embodiments, the search system searches and/or otherwise utilizes records to identify applications. Each record may identify an application with an application identifier and may include an associated result score. The result score may indicate a relevance of the application to the search query. In various embodiments, the search system computes the result score based on information contained in the record. The result score may be computed in real time.

A user device 104 may receive a set of search results from the search system that are responsive to the search query transmitted to the search system. The user device 104-1 may be running an application including a GUI that displays the search results received from the search system. The GUI utilized to transmit the search query may also display the search results to the user. In one example, the GUI may display the search results on the user device 104-1 as a list of application names.

In some implementations, a user device 104-1 may enable a user to select one of the applications identified in the search results in order to view information related to the application and/or download the application from the search results (e.g., by utilizing a link in the search results to download the application). In some embodiments, applications associated with the search results may be accessed from many locations. For example, applications identified in the search results may be downloadable from a digital distribution platform 106 that is configured to distribute the applications identified in the search results.

In some implementations, a user device 104-1 may provide a search query and a recommendation request to the search system. The search system may receive the search query and provide the recommendation request and/or installed application information to the recommendation system 102. The recommendation system 102 may identify candidate application groups from a plurality of application groups using the installed application information. The recommendation system 102 may select one or more applications to recommend from the identified candidate application groups and provide recommendation data identifying the selected application(s) to the user device 104-1 that provided the search query. In various embodiments, the recommendation system 102 provides the recommendation data to the search system. The search system may include all or some of the recommendation data (e.g., links to any number of the recommended applications) in the search results that are provided to the user device 104-1.

The search results from the search system and the recommended applications from the recommendation system 102 may be displayed by the user device 104-1. In some embodiments, the recommended applications may be displayed with the search results by an application or browser on the user device 104-1.

Figure 2:
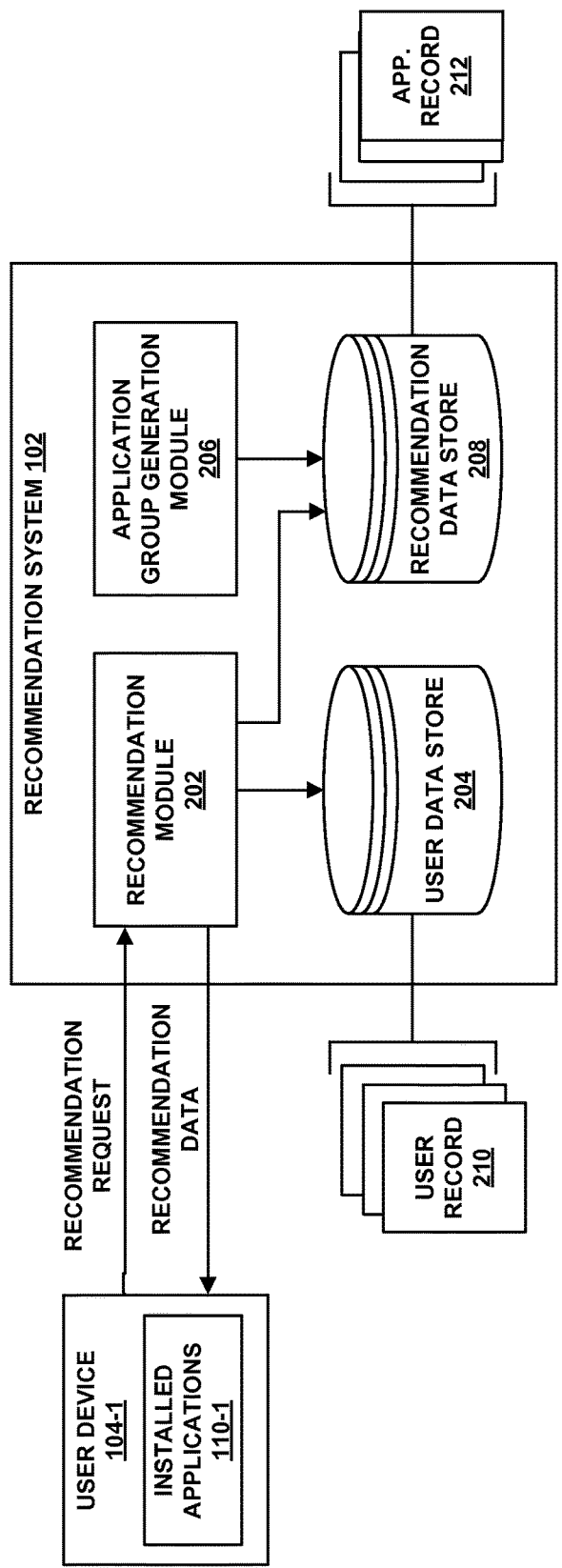
FIG. 2 shows an example of a recommendation system configured to provide personalized application recommendations.

FIG. 2 shows an exemplary embodiment of the recommendation system 102 configured to provide personalized application recommendations to a user. As shown, the recommendation system 102 includes a recommendation module 202 that is configured to communicate with user device 104-1 to receive recommendation requests and transmit recommendation data.

A recommendation request may be a request for an application recommendation (i.e., recommendation data) to be transmitted to the user device 104-1. The recommendation request may, in some embodiments, include a user device identifier identifying the user device 104-1 to receive the recommendation data and/or a user associated with the user device 104-1. In some embodiments, a recommendation request is provided from a user device (e.g., user device 104-1) either directly or indirectly (e.g., via one or more other computing devices such as the search system or digital distribution platform) to the recommendation system 102.

In some embodiments, the user device 104-1 may include a client-side application configured to collect and/or receive installed application information and/or user data. The installed application information may identify any number of applications (e.g., application identifiers) installed on the user device 104-1. As discussed herein, the user data may include any data associated with and/or describing the user, the user device 104-1, geolocation of the user device, usage of the installed applications, and/or the like. In some embodiments, the client-side application may receive installed application information from a user of the user device 104-1 (e.g., receiving indications of installed applications from the user through an interface provided by the application or another application). In various embodiments, the client-side application may collect information about installed applications from the user device 104-1. The collection of information from the user device 104-1 may be initiated by a command of the user, initiated at a predetermined time(s), and/or initiated at predetermined interval(s).

The client-side application may, in some embodiments, select application identifiers that identify applications installed on the user device 104-1 to include in the installed application information and/or select application identifiers to remove from the installed application information prior to providing the installed application information to the recommendation system 102. In some embodiments, the client-side application may include any number of application selection rules. An application selection rule is an instruction to select an installed application for inclusion in the installed application information or remove an identified application from the installed application information.

In one example, the user device 104-1 may include any number of application selection rules may include instructions to remove application identifiers that identify common applications from the installed application information. Examples of common applications include but are not limited to applications that are a part of an operating system, bundled applications from major carriers (e.g., applications that are included with an operating system on any number of mobile devices provided by SAMSUNG), or any other applications. In some embodiments, the application selection rule may include or function as a blacklist that identifies a list of application identifiers that are not to be included in the installed application information.

In some embodiments, the client-side application may not include within or remove application identifiers from the installed application information but may collect information regarding some of the installed applications to include in the installed application information. For example, the client-side application may scan the user device 104-1 to identify installed applications. The client-side application may collect information on some but not all installed applications based on one or more application selection rule(s) (e.g., the client-side application not collecting information regarding prepackaged applications but collecting information regarding other applications based on the application selection rule(s)).

The installed application information may be provided to the recommendation system 102 in any number of ways. In some embodiments, the installed application information may comprise a set of application identifiers. Alternately, for example, the installed application information may include application identifiers in an encoded format (e.g., a bloom filter).

The installed application information and/or usage data may be provided to the recommendation system 102 in any number of ways. In some embodiments, installed application information and/or usage data of a user device 104-1 may be provided by the user device 104-1 or any other device (e.g., another user device, a search system, or a digital distribution platform 106). The installed application information and/or usage data may be provided to the recommendation system 102 periodically, at a schedule, at set duration, manually (e.g., by a user), or at any other time. It will be appreciated that the installed application information and/or usage data may be provided without a recommendation request (e.g., a request for an application recommendation).

In some embodiments, user devices 104-1 . . . 104-N may communicate with the recommendation system 102 via a partner computing system (not illustrated). The partner computing system may be a computing system of a third party that may leverage the recommendations of the recommendation system 102. Example third parties that may leverage the functionality of the recommendation system 102 may include, but are not limited to, Internet search providers and wireless communications service providers. In one example, the user devices 104-1 may send installed application information, usage data, and/or recommendation requests to the recommendation system 102 and receive application recommendations via the partner computing system. The partner computing system may provide a user interface to the user devices 104-1 in some examples and/or modify the search experience provided on the user devices 104-1.

In some embodiments, prior to the set of application identifiers being provided as installed application information, the user may review the set of application identifiers and make additions (e.g., adding one or more new application identifiers) and/or deletions (e.g., removing one or more application identifiers from the set). In some embodiments, the user device 104-1 may present a user interface including a list of application identifiers. The user may check or otherwise select the application identifiers to provide to the recommendation system 102 the set of application identifiers. Similarly, the user may uncheck or otherwise de-select any, some, or all of the application identifiers from the list that indicates the user does not wish to provide the de-selected application identifiers to the recommendation system 102. The user device 104-1 may provide the (potentially user curated) set of applications identified (i.e., the installed application information) to the recommendation system 102.

It will be appreciated that the application selection rule(s) may be modified (e.g., updated) by the user (e.g., through an interface of the client-side application). In some embodiments, the application selection rule(s) may be updated by a different computing device such as the recommendation system 102. In one example, the recommendation system 102 may provide updated application selection rule(s) to add or replace application selection rule(s) utilized by the client-side application.

Although examples discussed herein may refer to a client-side application, it will be appreciated that the functions described herein may be performed on any number of client-side applications and/or remote computing devices.

Usage data may include other information in addition to or instead of installed application information. For example, the user data may include usage data, geolocation information, and/or uninstalled application information. Usage data includes measurements or any other information that may indicate if an application on the user device 104-1 is used, how the application is used, when the application was last used, how regular usages has been, how long the application has been used, and/or other information. In some embodiments, the usage data may be provided by the user (e.g., via a user interface) to the client-side application and/or the recommendation system 102. For example, the user may identify any number of applications as being very used, slightly used, or not used at all. It will be appreciated that the user may provide qualitative or quantitative usage data. In various embodiments, the client-side application may monitor application usage or retrieve application usage data from other application(s) or the operating system. The client-side application may provide the usage data within or with the recommendation request. In some embodiments, the client-side application may provide the usage data to the recommendation system 102 or any computing device at any time (e.g., provide regular updates with or without a recommendation request).

Any, some, or all usage data may be provided to the recommendation system 102 in any number of ways. For example, any, some, or all usage data may be provided from the user device 104-1 to the recommendation system 102 in the recommendation request. Any, some, or all usage data may be provided to the recommendation system 102 at any time. For example, the client-side application may periodically provide any, some, or all usage data to the recommendation system 102 based on a schedule, after predetermined durations, when there is sufficient bandwidth or the user device 104-1 is not being used, or the like.

In some embodiments, application selection rules may include instructions to identify applications that are sufficiently used by the user and/or user device 104-1. For example, the application selection rules may include instructions that instruct the client-side application to check usage data for any number of installed applications. If the client-side application determines that an installed application is sufficiently used (e.g., usage data indicates that the application has been used at all, recently used, or that an application's duration of use exceeds a predetermined duration threshold), then the client-side application may include sufficiently used application identifier(s) within the installed application information.

Geolocation information may include information identifying a location of the user device 104-1 (e.g., GPS coordinates). In some embodiments, the client-side application may retrieve GPS coordinates from a GPS device of the user device 104-1. The client-side application may provide the GPS coordinates as geolocation information within or with the recommendation request. In some embodiments, the client-side application may provide the geolocation information to the recommendation system 102 or any computing device at any time (e.g., provide regular updates with or without a recommendation request).

Uninstalled application information may include any number of application identifiers that identify applications that have been uninstalled from the user device 104-1. In various embodiments, the client-side application may receive one or more application identifiers of uninstalled or undesired applications from the user of the user device 104-1. In some embodiments, the client-side application may monitor the user device 104-1 to determine if an application is uninstalled and/or may periodically determine if one or more applications have been uninstalled.

Although some embodiments discussed herein describe the application selection rules being on the mobile device 104-1, the application selection rules as well as the functions described with regard to the application selection rules may be performed by the recommendation system 102, another digital device (e.g., search system), and/or mobile device 104-1.

User data, installed application information, and/or the recommendation request may include a device type identifier (e.g., smartphone, tablet, watch, laptop, or the like) and/or a platform identifier (e.g., ANDROID, IOS, WINDOWS, or the like).

Figure 5B:
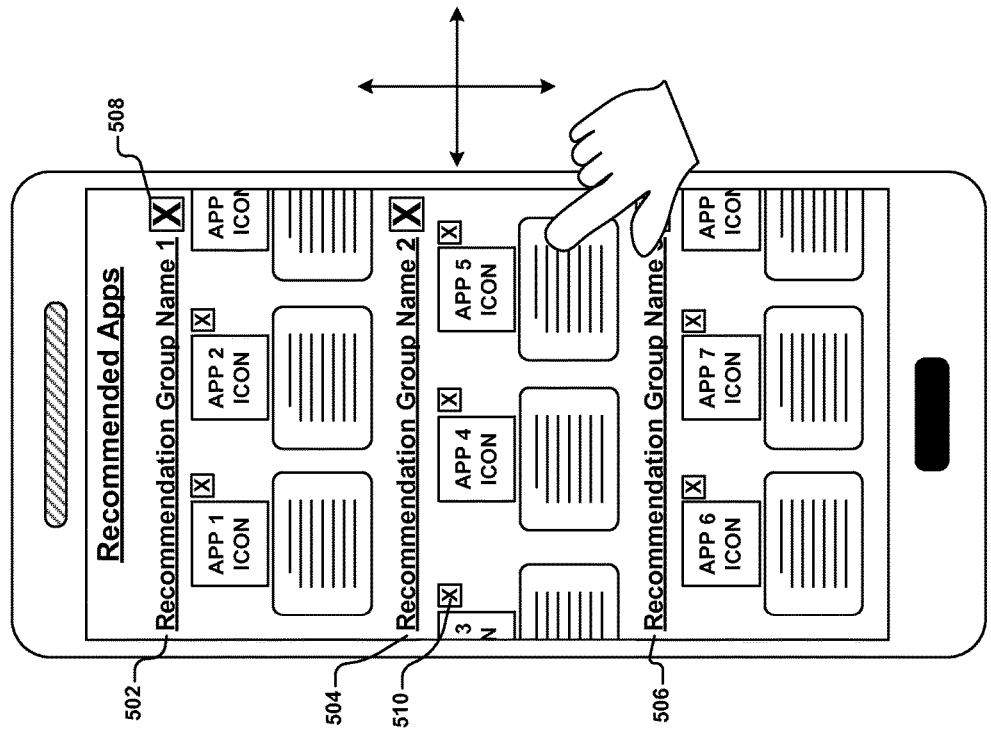
FIGS. 5A and 5B show screenshots of recommendation data that may be displayed on a client device.
Figure 5A:
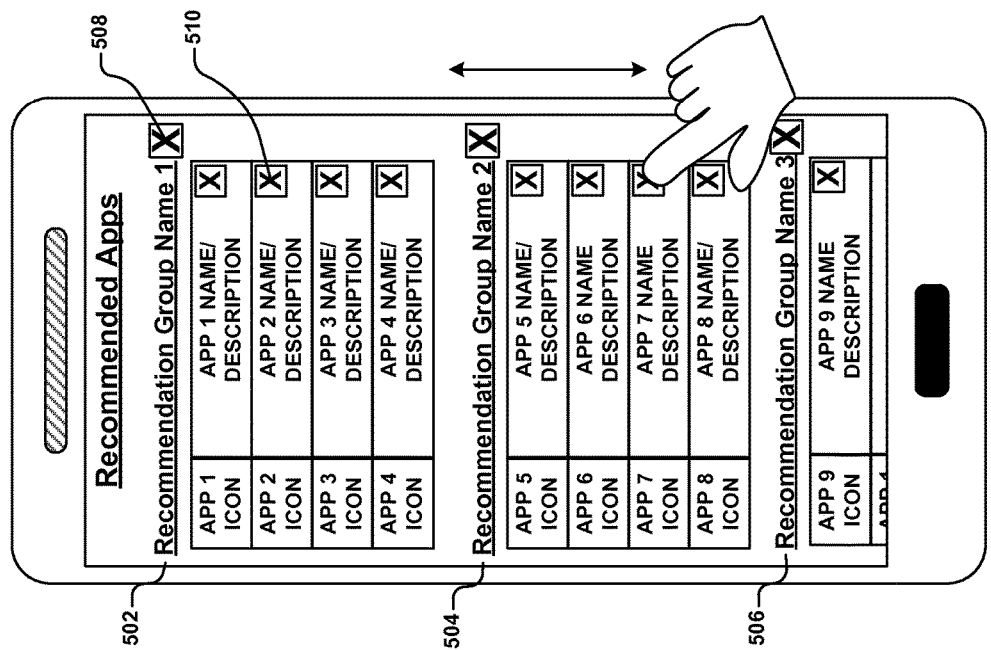

The recommendation request may be provided by the user device 104-1 in any number of ways. For example, a user may utilize a client-side application, web browser, email application, text application, or the like may provide the recommendation request to request an application recommendation. For example, the user device 104-1 may include a client-side application that is configured to provide recommendation requests and/or display recommendation data. It will be appreciated that the client-side application may perform any number of functions. For example, in addition to providing recommendation requests, the client-side application may allow the user of the user device 104-1 to construct and/or provide search queries to a search system as described herein. In some embodiments, the client-side application may provide a search query including (or in addition to) a recommendation request to the search system, the recommendation system 102, or both. FIGS. 5A and 5B are example screenshots of recommendation data that may be displayed by the client-side application on the user device 104-1 to a user. Alternately or in addition, a web browser, email application, text application, or the like may perform any or all of these functions.

In some embodiments, the recommendation system 102 may receive user data from a third party device (e.g., the digital distribution platforms 106) in network communication with the recommendation system 102. For example, the user and/or user device 104-1 may be associated with an account of a particular digital distribution platform 106. The digital distribution platform 106 may (e.g., with the user's approval) provide user data to the recommendation system 102. For example the digital distribution platform 106 may provide the recommendation system 102 with uninstalled application identifiers that identify applications that have been uninstalled from the user device 104-1 and/or application identifiers that identify applications that have been installed on the user device 104-1 from the digital distribution platform 106.

The recommendation system 102 may include a user data store 204 configured to maintain user records 210 for users and/or user devices (e.g., user device 104-1). A user record 210 may identify or include any, some, or all installed application information and/or user data associated with a user and/or user device. In some embodiments, the recommendation module 202 may communicate with the user data store 204 to access, store, and/or modify user records 210.

For example, upon receiving user data from a user device 104-1 and/or any other source, the recommendation module 202 may communicate with the user data store 204 to store the received user data and/or modify the corresponding user record 210. In some embodiments, the recommendation module 202 may communicate with the user data store 204 to retrieve at least some of the stored user data (e.g., after receiving a recommendation request from a client device 104-1). It will be appreciated that the recommendation system 102 may use previously stored user data from the user data store 204 and/or user data received (e.g., with the recommendation request) when applying application selection rules and/or selecting application groups as candidate application groups.

In some embodiments, the recommendation module 202 may use the user data to identify a set of application groups as "candidate application groups" from which applications may be recommended to the user. An application group may be a set of two or more application identifiers that identify applications. Each application group may include application identifiers that identify applications that share at least one category such as popularity (e.g., as reported by a digital distribution platform 106), trending applications, and/or applications that are similar (e.g., games, communication applications, social media applications, or the like). Each application group may be associated with and/or defined by application group data (e.g., application group data 302 in FIG. 3).

Figure 3:
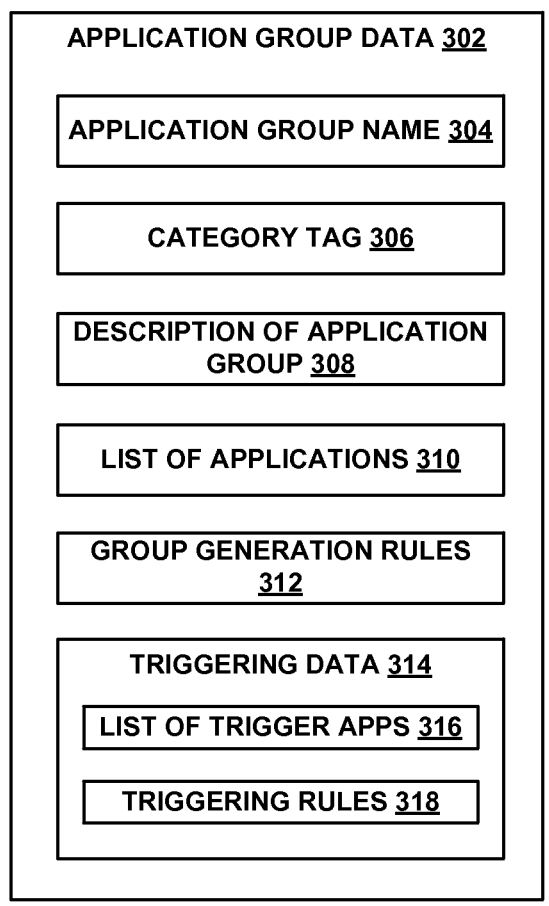
FIG. 3. shows an example of application group data.

FIG. 3 shows an example of application group data 302. Each application group data 302 may include and/or identify an application group name 304, category tag(s) 306, a description of application group 308, a list of applications 310, group generation rules 312, and/or triggering data 314. The application group data 302 may include an application group name 304 identifying the application group (e.g., the application group name 304 may be or include a name such as "Top Communication Applications").

The application group data 302 may include one or more group category tags 306 associating categories of applications with the application group. For example, a group category tag 306 may categorize (e.g., include "tags" for) type(s) of applications (e.g., sports, racing games, messaging, or productivity) that may be included in the application group. There may be any number of group category tags 306 for each group.

In some embodiments, the group category tags 306 are assigned by an administrator, a user (e.g., via an interface provided by the client-side application), or application developers, and/or other individual(s). It will be appreciated that a digital distribution platform 106 may assign categories and/or tags to applications and/or application groups. In various embodiments, the recommendation system 102 may retrieve and/or receive category and/or tag assignments from any number of digital distribution platforms 106 and utilize the information in assigning any, some, or all of the group category tags 306.

The application group data 302 may include a description of the application group 308. The description of the application group 308 may include text, images, and/or the like that describe the application group and/or the applications included in the application group. In some embodiments, the description of the application group 308 includes additional descriptive information beyond that which is provided by the application group name 304. For example, the description of the application group 308 may describe that an application group includes the top ten game applications based on popularity. The description of the application group

308 may further include a description that describes how popularity was determined and from what source(s).

The application group data 302 may include any number of application member identifiers in the list of applications 310. Application member identifiers identify applications that are members of a particular application group. The list of applications 310 may include names of applications or any identifying information that identify or describe applications that are members of a group. In some embodiments, the list of applications 310 may each be associated or assigned at least one common tag or category.

The application group data 302 may include group generation rules 312 that are instructions of criteria for inclusion of applications (e.g., application identifiers) in the application group (e.g. criteria to be met before an application may be identified in the list of applications 310). For example, the group generation rules 312 may dictate the types or categories of applications that may be included in the application group, such as games, social networking, or the like. In some embodiments, the group generation rules may provide instructions for performance conditions that are to be met before an application may be assigned to the application group. For example, the group generation rules 312 may provide instructions that applications that meet or exceed a predetermined threshold number of downloads may be included in the application group. Alternatively, the group generation rules 312 may provide instructions that applications that meet or exceed a predetermined grossed revenue amount may be included in the application group. In another example, the group generation rules 312 may provide instructions that only the top ten popular applications as identified by one or more digital distribution platforms 106 be identified for the application group.

The application group data 302 may further include triggering data 314. The triggering data 314 may include or identify a list of trigger applications 316 and/or triggering rules 318. The list of trigger applications 326 may include application identifiers that identify applications that, if installed on the user device 104-1, may be used to identify a candidate application group. For example, the list of trigger applications 316 may include a list of application identifiers that, if installed on a user device 104-1, may indicate that the application group is to be identified as a candidate application group. In various embodiments, the recommendation system 102 may utilize triggering rules 318 and the list of trigger applications 316 to identify one or more candidate application groups.

The list of trigger applications 316 may identify any number of applications that are members of the application group associated with the application group data 302. In some embodiments, one or more of the applications identified in the list of trigger applications 316 may not be members of the application group but may trigger selection of the application group as a candidate application group. For example, although Angry Birds may no longer be a popular trending game, it was a popular trending game so the "trending popular group" application group may be selected as a candidate application group by having Angry Birds (e.g., the user's installed applications include identifiers that identify Angry Birds or games similar to Angry Birds), but Angry Birds may not be shown to the user as a recommendation.

Triggering rules 318 may include instructions regarding whether the application group should be identified as a candidate application group from which applications may be recommended to a user. For example, the triggering rules 318 may dictate that a particular application group be identified as a candidate application group if at least one application identified in the list of trigger applications 316 is installed on the user device 104-1. The process of identifying candidate application groups from a plurality of application groups is described herein.

Returning to the discussion of FIG. 2, the recommendation module 202 may identify one or more application groups as candidate application group(s) based on the set of installed application identifiers from the recommendation request. In some embodiments, the recommendation module 202 may determine which application groups of a plurality of application groups identify an application that is also identified by the installed application identifiers. For example, the recommendation module 202 may determine that membership of a particular application group includes a particular application (e.g., iCATCHER!) that is also identified by the installed application identifiers. The particular application group may be identified as a candidate application group based on the determination. The recommendation module 202 may subsequently select one or more applications to recommend from the candidate application group.

User data, installed application information, and/or the recommendation request may include a device type identifier (e.g., smartphone, tablet, watch, laptop, or the like) and/or a platform identifier (e.g., ANDROID, IOS, WINDOWS, or the like). It will be appreciated that the recommendation module 202 may remove or otherwise not consider application groups that include applications for a different device type and/or platform identifier than that of the user device 104-1. In some embodiments, the recommendation module 202 may receive a device type identifier and/or a platform identifier of the user device 104-1 that is to receive the recommendation data (either directly from the recommendation module 202 or via another computing device such as a third-party partner). The recommendation system 102 may disregard application groups and/or filter candidate application groups that are associated with or contain applications for device types and/or platforms that are different from the device type and/or platform of the user device 104-1.

In some embodiments, each application group may be associated with a set of triggering rules (e.g., triggering rules 318) that provide conditions that, if met, may result in the application group being identified as a candidate application group for the user. As discussed herein, for example, the triggering rules 318 may provide instructions for identifying an application group as a candidate application group if at least one application included in the application group (e.g., an application identified in the list of trigger applications 316) is installed on the user's device (e.g., user device 104-1).

The recommendation module 202 may compare any, some or all of the set of installed application identifiers to applications that are members of the application group to determine whether the application that are members of the application group is installed on the user's device. In some embodiments, if at least one application group identifier in the set of installed application group identifiers matches an application identifier in the application group, the recommendation module 202 may determine that the triggering rule 318 is satisfied and the application group may be identified as a candidate application group. It will be appreciated that the triggering rules 318 may require that a predetermined number of applications be both a member of an application group and identified in the installed application identifiers before the application group may be considered a candidate application group.

In some embodiments, the triggering rules 318 may require that other conditions be satisfied before the application group is considered a candidate application group. For example, the recommendation module 202 may determine, using the triggering rules 318 and user data (e.g., the user data associated with the user device 104-1), whether any number of application group(s) qualify as candidate application group(s) for the user. If, based on the triggering rules 318 and the user data, the recommendation module 202 determines that the triggering rules 318 are satisfied, the recommendation module 202 may identify any number of application group(s) as candidate application group(s) for the user.

Different triggering rules 318 may apply to any number of application groups (e.g., one or more application groups). As discussed herein, usage data may include, but is not limited to, application usage data, geolocation information, and/or uninstalled application information. For example, as discussed herein, usage data may include measurements or any other information that may indicate if an application on the user device 104-1 is used, how the application is used, and/or how long the application has been used.

The triggering rules 318 may require that a particular application identified in the installed application information be sufficiently used (e.g., used at all, used over a predetermined threshold, frequently used, recently used, or the like) before identifying candidate application groups based on membership of that particular application. In another example, the recommendation module 202 may determine if a particular application identified in the installed application information is a member of a particular application group and subsequently determine if the particular application is sufficiently used before identifying the particular application group as a candidate application group.

In some embodiments, the recommendation module 202 may determine if an application identified by the installed application information is used at all. In another example, the recommendation module 202 may compare usage data indicating a duration of usage of a particular application identified by the installed application information to a usage threshold. The recommendation module 202 may, based on one or more triggering rules 318, determine that the particular application is a member of any application groups if the particular application exceeds a usage threshold (e.g., the particular application is used more than a predetermined threshold). It will be appreciated that usage data may be utilized by the recommendation module 202 in any number of ways.

The user data may include geolocation information. As discussed herein, geolocation information may include information identifying a location of the user device 104-1 (e.g., GPS coordinates). Different application groups may be associated with different geolocation information. In some embodiments, the triggering rules 318 may require that a particular application group be proximate to or associated with a location identified by the geolocation information (e.g., a location that is proximate to the user device 104-1 to which application recommendations will be provided) before being considered as a candidate application group.

In various embodiments, based on the triggering rules 318, the recommendation module 202 may identify potential candidate application groups based on membership of applications identified by the installed application information. Subsequently, the recommendation module 202 may filter or otherwise remove any potential candidate application groups associated with a particular location that is not proximate to the location identified by the geolocation information. The recommendation module 202 may also determine that any potential candidate application groups that are associated with a particular location that is proximate to the location identified by the geolocation information is a candidate application group. For example, a candidate application group may identify applications that are locally popular to the user or the user device 104-1 (e.g., applications that are members of the "Miami applications" application group).

The user data may include uninstalled application information. As discussed herein, uninstalled application information may identify applications that have been uninstalled from the user device 104-1. In one example, the recommendation module 202 may identify any number of candidate application groups. Subsequently, the recommendation module 202 may, based on the triggering rules 318, determine that a particular candidate application group identifies one or more applications that have been uninstalled based on the uninstalled application information.

In some embodiments, the recommendation module 202 may determine that a candidate application group is no longer a candidate application group if the candidate application group includes a sufficient number of applications that have been uninstalled. For example, the recommendation module 202 may compare a number of applications that are members of a candidate application group and have also been uninstalled from the user device 104-1 to an application uninstallation threshold. If the number of applications that are members of the candidate application group and have also been uninstalled from the user device 104-1 exceed the threshold and/or represents (or exceeds) a significant percentage of the application membership of the candidate application group, then the recommendation module 202 may determine that the candidate application group is no longer a candidate application group.

In some embodiments, the recommendation module 202 may filter out application groups and/or candidate application groups based on category (e.g., tags). For example, the recommendation module 202 may identify a number of application groups. The recommendation module 202 may compare the categories associated with each group and remove candidate application groups with the same categories, with more general categories, and/or the like.

The recommendation module 202 may select one or more candidate application groups from any number of candidate application groups to select any number of applications to recommend. The recommendation module 202 may select the candidate application groups in any number of ways. In some embodiments, the recommendation module 202 may select any number of candidate application groups from a plurality of candidate application groups at random. For example, the recommendation module 202 may identify ten candidate application groups and select three of the ten candidate application groups at random. In some embodiments, the number of candidate application groups to be selected may be fixed or selected at random.

Alternatively, in some embodiments, the recommendation module 202 may rank the candidate application groups and select one or more of the candidate application groups based on the ranking. For example, the recommendation module 202 may determine a recommendation score for each of the candidate application groups and then select any number of candidate application groups based on the determined recommendation scores. Recommendation scores may be determined in any number of ways. For example, the recommendation score for each candidate application group may be determined based on a scoring function. The scoring function may be based on the number of "matching applications" that are included in the candidate application group and are also installed on the user device 104-1. The scoring function may also be determined, modified, or weighted based on any number of factors including, but not limited to user data.

In some embodiments, the recommendation module 202 may determine the recommendation score for a candidate application group based on the number of "matching applications" that are included in the candidate application group and are also installed on the user device 104-1. For example, the recommendation module 202 may compare the list of installed application identifiers to the list of application identifiers associated with an candidate application group to identify "matching application identifiers" that are included in the set of candidate application identifiers and the set of installed application identifiers (i.e., application identifiers installed on the user device 104-1). For each matching application identifier (i.e., installed application identifier that matches at least one of the candidate application identifiers from the list of candidate application identifiers), the recommendation module 202 may assign higher recommendation scores. The recommendation module 202 may assign higher recommendation scores to application groups determined to include a higher number of matching applications. Likewise, the recommendation module 202 may assign a lower recommendation score to application groups determined to include a lower number of matching applications.

In some embodiments, the recommendation module 202 may determine the recommendation score for a candidate application group based on the usage data for the matching applications in the candidate application group. For example, the recommendation module 202 may increase the recommendation score for a candidate application group based on each matching application included in the candidate application group that has a usage value (e.g., as indicated in the user data) that meets or exceeds a predetermined usage threshold level. Alternatively, the recommendation module 202 may decrease or not change the recommendation score for a candidate application group for each matching application in the candidate application group that has a usage level that is below a predetermined usage threshold level. As discussed herein, the usage value may include a value indicating that an application has been used, time of last use, frequency of use, duration of use, and/or the like. There may be any number of thresholds for each value and/or combination of values.

In some embodiments, the recommendation module 202 may determine the recommendation score of a candidate application group based on whether applications in the candidate application group have been uninstalled from the user device 104-1. The recommendation module 202 may compare a list of uninstalled application identifiers that identify applications that have been uninstalled from the user device 104-1 to the list of identifiers of applications that are members of any number of candidate application groups to determine if an application included in the candidate application group has been uninstalled from the user device 104-1. In some embodiments, a determination that the candidate application group includes an application that was uninstalled on the user device 104-1 may have a negative effect on the recommendation score of the candidate application group. For example, the recommendation module 202 may reduce and/or otherwise adjust the recommendation score of candidate application groups determined to include applications that have been uninstalled from the user device 104-1.

In some embodiments, the recommendation module 202 may determine or modify a recommendation score of a candidate application group based on a popularity value of the matching applications included in the candidate application group. Applications that are popular and/or commonly downloaded may be a weak indicator regarding a user's preferences towards applications whereas unpopular or uncommon applications that are installed on the user device 104-1 may indicate a significant interest of the user and therefore may be a strong indicator of the user's preferences towards such applications. Accordingly, the recommendation module 202 may adjust (e.g., increase or decrease) the recommendation score of a candidate application group based on the popularity of the matching applications included in the candidate application group. In some embodiments, if a matching application has a low popularity value indicating that the application has not been downloaded by many users, the recommendation module 202 may increase the recommendation score for the candidate application group. If a matching application has a high popularity value indicating that the application has been downloaded by many users, the recommendation module 202 may reduce the recommendation score for the candidate application group.

In another example, the recommendation module 202 may be configured to adjust a recommendation score for a candidate application group containing an obscure application that is identified in the application installation information. For example, if the user has a relatively obscure application (e.g., uncommon and/or low popularity) that is used often and/or regularly by the user (e.g., as indicated by the user data), the recommendation module 202 may adjust the recommendation score of the candidate application group containing the obscure application. It will be appreciated that an obscure application that is used often and/or regularly may be a stronger indicator that similar applications (e.g., other applications that are members of the same application group as the obscure application) may be of interest to the user.

In some embodiments, the recommendation module 202 may be configured to determine or modify the recommendation score for a candidate application group based on whether the matching applications were purchased or downloaded for free. For example, the recommendation module 202 may increase the recommendation score for each matching application included in the application group which was a paid application.

Further, the recommendation module 202 may be configured to determine or modify the recommendation score for a candidate application group based on the number of downloads of member applications (e.g., the number of downloads being tracked by a digital distribution platform 106). For example, candidate application groups with a number or percentage of member applications that exceed a download threshold (e.g., the number of downloads of the applications meet or exceed a download threshold) may be scored higher or may have their recommendation score adjusted.

The recommendation module 202 may select one or more of the candidate application groups based on the recommendation scores. The recommendation module 202 may then recommend one or more applications (e.g., all applications or a subset of applications) from the selected candidate application groups to the user. For example, the recommendation module 202 may rank the candidate application groups based on recommendation score (e.g., those candidate application groups with the highest recommendation score may be ranked highest). The recommendation module 202 may then select the candidate application group(s) with the highest recommendation score(s).

The recommendation module 202 may select any number of candidate application groups when selecting applications to recommend to the user device 104-1. The selection of candidate application groups may occur in any number of ways. In some embodiments, the recommendation module 202 may select any number of applications to recommend from a predetermined number of candidate application groups (e.g., the top three candidate application groups based on recommendation scores). In various embodiments, the recommendation module 202 may select any number of applications to recommend from any candidate application groups that have recommendation scores above a recommendation score threshold. In further embodiments, the recommendation module 202 may select any number of applications to recommend from any number of candidate application groups that have comparatively high recommendation scores when compared to other candidate application groups.

Upon selection of a candidate application group, the recommendation module 202 may select one or more applications included in the selected candidate application group to recommend to the user. In some embodiments, the recommendation module 202 may select applications that are members of the candidate application group(s) to recommend in any number of ways. In some embodiments, the recommendation module 202 may select applications at random. In various embodiments, the recommendation module 202 may select applications based on popularity (e.g., as tracked and provided by a digital distribution platform 106), trending, date the application was published or otherwise available for download, number of downloads, or any other information.

In some embodiments, the recommendation module 202 may recommend applications to the user from the selected candidate application group that the user does not have installed on their user device 104-1. For example, the recommendation module 202 may identify application identifiers included in a selected candidate application group that do not match any of the installed application identifiers identifying applications installed on the user device 104-1. The recommendation module may then transmit recommendation data recommending the applications to the user device 104-1.

The recommendation module 202 may recommend applications to the user that do not appear to have been previously installed on the user device 104-1. For example, the recommendation module may identify candidate application identifiers from a selected candidate application group that do not match any of the installed application identifiers or the uninstalled application identifiers. The recommendation module 202 may then transmit recommendation data recommending the application to the user device 104-1. Further, the recommendation module 202 may choose not to recommend applications to the user that have been uninstalled from the user device 104-1.

In some embodiments, the recommendation data transmitted to the user device 104-1 may enable the user to provide feedback regarding the application recommendation(s). For example, the recommendation data and/or application on the user device 104-1 that may display all or part of the recommendation data, may include an interactive element such as a link, button, or the like that a user may select to indicate that the user likes or dislikes the received application recommendation. Selection of the interactive element may cause the user device 104-1 to transmit feedback data to the recommendation system 102.

The recommendation module 202 may use received feedback to select future application recommendations for the user. For example, if the user provides positive feedback regarding an application recommendation selected from a candidate application group, the recommendation module 202 may provide further recommendations from the candidate application group. Alternatively, if the user provides negative feedback regarding an application recommendation selected from a candidate application group, the recommendation module 202 may not recommend applications from the candidate application group. In some embodiments, the recommendation module 202 may adjust the recommendation score associated with the candidate application group based on positive or negative feedback.

In various embodiments, the application group generation module 206 may access the application records 212 and application group data 302 from the recommendation data store 208 to generate application groups. For example, the application group generation module 206 may access the group generation rules 312 and analyze any number of application records 212 to determine the applications that should be included in each application group. The application group generation module 206 may modify the application group data 302 associated with an application group to add or remove application identifiers from the list of application group identifiers 310 included in the application group.

A group generation rule 312 may be any type of rule providing instructions for grouping of applications. For example, a group generation rule 312 may provide instructions that an application group include the top twenty applications based on application popularity (e.g., as ranked by one or more digital distribution platforms 106, users, and/or third party devices).

As another example, a group generation rule 312 may provide instructions that an application group identify applications related to specified categories (e.g., tags). For example, groups may be defined by grouping applications that include similar characteristics that may be categorized (e.g., tagged). In some embodiments, an administrator may initially create an application group, define the category of applications that are members of the group, and/or identify applications that are members of the application group.

Each application may be associated with any number of tags that identify different types of categories. In some examples, tags may be defined and/or assigned by the recommendation system 102, a user of the user device 104-1, other user(s), and/or any number of digital distribution platforms 106. For example, the application group generation module 206 may define and/or assign an application group with any number of tags. The application group generation module 206 may retrieve, from a digital distribution platform 106, application identifiers and/or identify applications associated with tags assigned by the digital distribution platform 106. In some embodiments, the application group generation module 206 may retrieve application identifiers from a digital distribution platform 106 that the digital distribution platform 106 both tags as being productivity applications and indicates are popular relative to other productivity applications.

The application group generation module 206 may update membership of an application group at any time. For example, the application group generation module 206 may define an application group as being associated with the trending game applications. Membership of the application group may be updated or modified periodically, at set durations, manually, or in any number of other ways. For example, the application group generation module 206 may retrieve information from any source (e.g., users or digital distribution platforms) at any time to update or otherwise modify membership of the application group (e.g., change any or all of the information associated with the application group data 302).

The recommendation system 102 may include a recommendation data store 208 configured to maintain data used to generate the application groups. For example, the recommendation data store 208 may maintain application records 212 describing applications. An application record 212 may include an application identifier identifying an application, description data describing the application, application category tag data (e.g., one or more tags) categorizing the application, purchase/download data indicating the number of purchases and/or downloads of the application, and/or the like. The recommendation data store 208 may also maintain application group data that describes the application groups.

In various embodiments, the recommendation system 102 may store recommendation data for any number of users and/or user devices in the recommendation data store 208. It will be appreciated that the recommendation system 102 may provide recommendations in real time (e.g., upon receiving of a recommendation request). The recommendation system 102 may, in some embodiments, generate and store recommendation data in the recommendation data store 208 prior to receiving a recommendation request in order to improve efficiency.

It will be appreciated that a module may be hardware, software, or a combination of both. For example, any or all components (e.g., modules) of the recommendation system 102 (e.g., the recommendation module 202 and/or the application group generation module 206) may be software that resides in memory and/or computer readable storage. Alternately, any or all of the components (e.g., modules) of the recommendation system 102 may be hardware (e.g., hard wired such as part of an Application-Specific Integrated Circuit (ASIC)).

Figure 4:
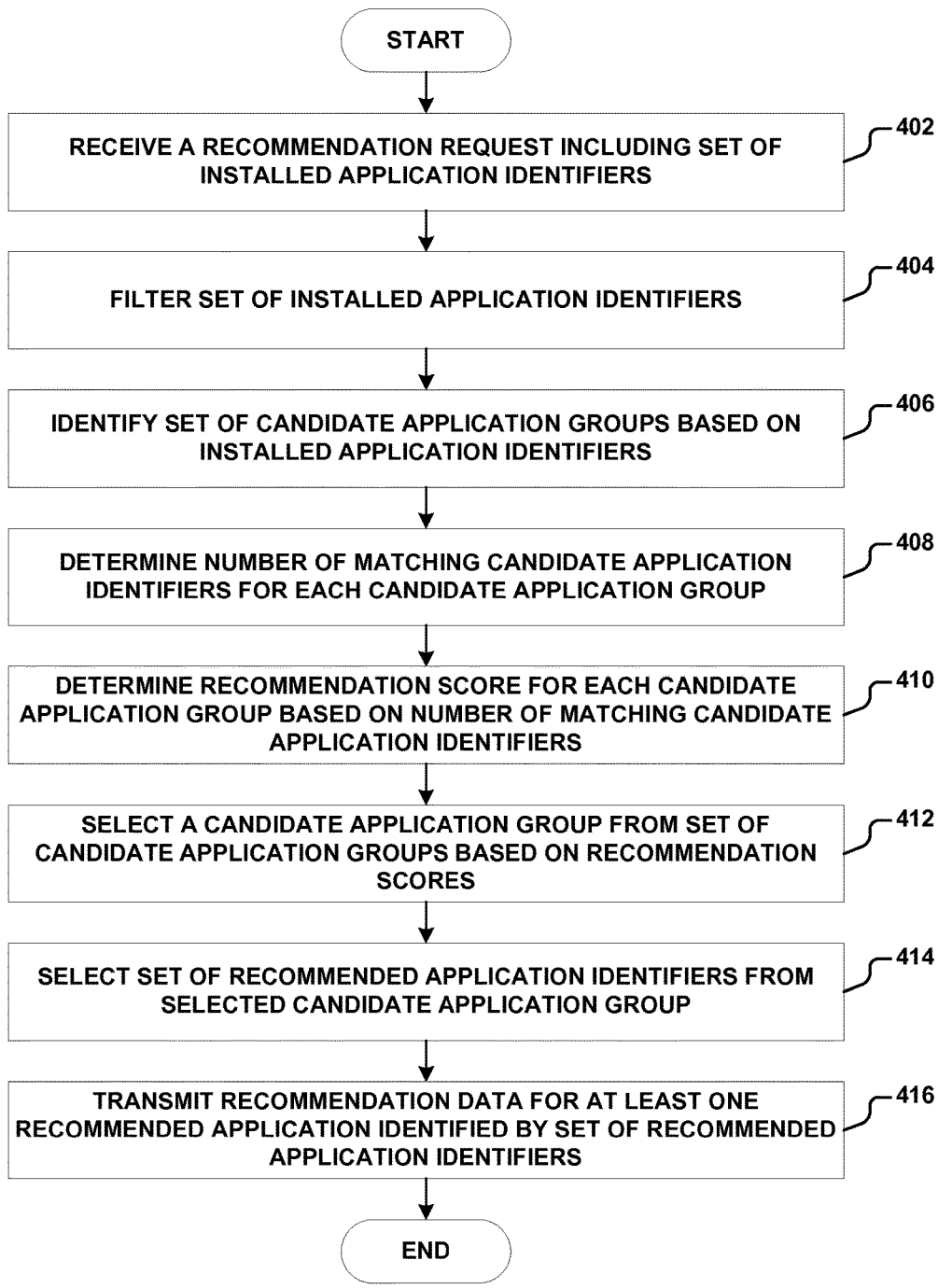
FIG. 4 shows an example method for providing personalized application recommendations to a user.

FIG. 4 shows an example method for providing personalized application recommendations to a user. In step 402, the recommendation system 102 receives a recommendation request that includes a set of installed application identifiers. The recommendation request may be a request received from a user device 104-1 for an application recommendation to be transmitted to the user device 104-1 or a request received from or via any device (e.g., a search system or digital distribution platform 106).

In step 404, the recommendation system 102 may filter the set of installed application identifiers. For example, some of the application identifiers in the set of installed application identifiers may identify applications that are reasoned to provide little or no value regarding the user's preferences regarding applications. Accordingly, the recommendation system 102 may filter the set of installed application identifiers to remove the application identifiers corresponding to these applications. For example, the recommendation module 202 may filter the set of installed application identifiers based on the usage value associated with the applications. A usage value may indicate the usage of the application by the user, such as the amount of time the application is used, the frequency at which the application is used, and/or the like. Applications that are installed on a user device 104-1 but receive little to no use may be deemed to provide little to no value regarding the user's preferences regarding applications. Accordingly, the recommendation module 202 may filter the set of installed application identifiers to remove application identifiers that identify applications associate with a usage value that is below a predetermined threshold usage value.

In some embodiments, the recommendation module 202 may filter the set of installed application identifiers based on whether the application identified was purchased or downloaded for free. Applications that a user purchased may be deemed to be a better indicator of the user's preferences regarding applications than applications which were downloaded by the user for free. Accordingly, the recommendation module 202 may be configured to filter the set of installed application identifiers to remove application identifiers identifying applications that were free downloads.

In another example, the recommendation module 202 may filter the set of installed application identifiers to remove any applications that are too common (e.g., bundled applications by manufacturers or operating system developers). In one example, the recommendation module 202 may filter the set of installed application identifiers to remove applications that are common among a large number of people.

In step 406, the recommendation module 202 may identify a set of candidate application groups based on the set of installed application identifiers. The recommendation module 202 may identify a subset of a plurality of application groups as candidate application groups from which to select application recommendations for the user.

Each application group may be associated with a set of triggering rules (e.g., triggering rules 318) that provide conditions that, if met, result in the application group being identified as a candidate application group for the user. For example, the triggering rules may include instructions that an application group be identified as a candidate application group if at least one application (potentially more) included in the application group is installed on the user's device (e.g., user device 104-1). The recommendation module 202 may compare the set of installed application identifiers to a set of application identifiers included in the application group to determine whether one or more applications included in the application group is installed on the user's device. If at least one application group identifier in the set of installed application group identifiers matches an application identifier in the set or candidate application group identifiers, the recommendation module 202 may determine that the triggering rule is satisfied and the application group may be identified as a candidate application group.

In various embodiments, the triggering rules 318 may be based on the usage of applications as well as their inclusion on the user device 104-1. For example, the triggering rules 318 may dictate that an application group be identified as a candidate application group if at least one application included in the application group is installed on the user device 104-1 and the matching application has met a predetermined usage threshold by the user (e.g., used more than a predetermined period of time).

The recommendation module 202 may also compare the usage data for any matching applications determined to be installed on the user device 104-1 to the predetermined usage threshold to determine whether the usage threshold has also been met. If the usage threshold for a matching application has been met, the recommendation module 202 may determine that the triggering rule 318 for the application group has been satisfied and identify the application group as a candidate application group for the user.

In some embodiments, the triggering rules 318 may be based on the location of the user and/or the user device 104-1. For example, the triggering rules 318 may indicate that the application group may be identified as a candidate application group if the location of the user device 104-1 is within a predetermined distance of a specified geographic location. The recommendation module 202 may use the location of the user device 104-1 to determine whether the triggering rule is satisfied, thereby identifying the application group as a candidate application group.

In step 408, the recommendation module 202 may determine a number of matching candidate application identifiers included in each candidate application group. The recommendation module 202 may compare the set of installed application identifiers to the set of candidate application identifiers for each candidate application group to determine the number of matching candidate application identifiers in the set of candidate application group that match at least one application identifier in the set of installed application identifiers.

At step 410, the recommendation module 202 may determine a recommendation score for each candidate application group based on the number of matching candidate application identifiers included in the candidate application group. The recommendation score may be influenced positively by each matching application identifier such that candidate application groups with a higher number of matching application identifiers may be assigned a higher recommendation score than candidate application groups with a lower number of matching application identifier.

In addition to the number of matching application identifiers, the recommendation module 202 may further determine the recommendation score for each candidate application group based on other user data such as the location of the user, application usage data, uninstalled application, application popularity, downloads, and/or the like. For example, the recommendation module 202 may increase the recommendation score for a candidate application group if the location of the user's device is within a predetermined distance of a geographic location associated with the application group. Likewise, the recommendation module 202 may reduce the recommendation score for an application group if the location of the user device is not within the predetermined distance of the geographic location associated with the application group. Thus, a candidate application group including applications that are regional to Dallas, Tex., may receive a low recommendation score if the user is located in California, whereas the same candidate application group may receive a high recommendation score if the user is located in Dallas.

Likewise, the recommendation module 202 may increase the recommendation score for a candidate application group based on the usage data of the matching applications included in the application group. Matching applications that have high usage by the user may be a strong indicator of the user's preferences regarding applications, whereas applications with low usage by the user may be a weak indicator of the user's preferences. Accordingly, the recommendation module 202 may increase the recommendation score for a candidate application group for each matching application that has a usage value that exceeds a predetermined threshold usage value. Likewise, the recommendation module 202 may decrease the application score of the candidate application group for each matching application that has a usage value that is less than a predetermined threshold usage value.

In some embodiments, the recommendation module 202 may determine the application score for a candidate application group based on the number of applications included in the candidate application group that have been uninstalled from the user's device. A user uninstalling an application may be an indicator that a user did not like the application and may therefore be used as an indicator regarding the user's preferences regarding that application as well as other applications that may share similar tags, groups, and/or descriptions. Accordingly, the recommendation module 202 may reduce the recommendation score for a candidate application group for each application in the candidate application group that the user uninstalled from their user device.

In some embodiments, the recommendation module 202 may determine the application score for a candidate application group based on the popularity of the matching applications included in the candidate application group. Applications that are unpopular (i.e., have been downloaded by relatively fewer users) may be a strong indicator of a user's preferences regarding applications, whereas applications that are popular (i.e., have been downloaded by a relatively high number of users) may be a weak indicator of the user's application preferences. Accordingly, the recommendation module may increase the recommendation score for a candidate application group for each application included in the candidate application group that has a popularity value that is below a predetermined threshold popularity value.

In step 412, the recommendation module 202 may select a candidate application group from the set of candidate application groups based the recommendation scores. For example, the recommendation module 202 may select any number of candidate application groups that have the highest recommendation score (e.g., in comparison with other candidate application groups or above a recommendation score threshold).

In step 414, the recommendation module 202 may select a set of recommended application identifiers from the selected candidate application group. The set of recommended application identifiers may identify applications included in the selected candidate application group that may be recommended to the user. In some embodiments, the recommendation module 202 may select the set of recommended application identifiers based on whether the corresponding applications are installed on the user's device or have been previously installed on the user's device. For example, the recommendation module 202 may be configured to recommend applications that are not currently installed on the user's device and/or do not appear to have been previously installed on the user's device. The recommendation module 202 may compare the set of candidate group application identifiers to the set of installed and uninstalled application identifiers to identify applications that are not currently installed on the user's device and/or do not appear to have been previously installed on the user's device. In this example, the candidate application identifiers that do not match any of the set of installed and uninstalled application identifiers may be selected as recommended application identifiers.

In step 416, the recommendation module may transmit recommendation data for at least one recommended application identified by the set of recommended application identifiers. Recommendation data may include data describing the recommended applications as well as interactive elements enabling a user to access the recommended applications. For example, the recommendation data may include an application name, description, images, and/or the like, for the recommended applications, as well as links enabling a user to download, purchase, preview, and/or the like, the recommended application.

FIGS. 5A and 5B show screenshots of recommendation data that may be displayed on a user device. As shown in FIG. 5A, application recommendations may be displayed in a list format from top to bottom along a display of the user device. A user may scroll up and down the list to view the various application recommendations listed. For example, as shown, a user may use their finger along a touch display of the user device to scroll up and down the list of application recommendations.

Application recommendations are provided from three different application groups 502, 504 and 506. The application recommendations from each application group are grouped together and listed under an application group name for each application group. As shown, application recommendations from application group 502 are listed at the top of the display, followed by application recommendations from application group 504, and then applications from application group 506.

Each recommended application listed may include an application icon, name, and/or description that describe the recommended application. In some embodiments, the application recommendations may be interactive, enabling the user to select the application recommendation to be presented with additional information regarding the recommended application. For example, in some embodiments the user may select to view more information regarding a recommended application by selecting the application recommendation using the touch display. This may result in a secondary page with additional recommendation data describing the recommended application to be displayed on the user device. For example, the secondary page may include additional text description, user reviews, ranking, images, and/or the like.

In some embodiments, the application recommendations may be interactive to enable the user to learn more about, preview, download and/or purchase the recommended application. For example, the user may select a recommended application using the touch display of the user device, thereby causing the user device to communicate with a digital distribution platform (e.g., digital distribution platform 106) and download the selected application. Alternatively, selection of the recommended application may cause a secondary window to appear from which the user may select to learn more about, preview, download and/or purchase the selected application.

The recommendation data received either directly or indirectly from the recommendation system 102 may indicate the order (e.g., rank) that the candidate application groups (e.g., as depicted in FIG. 5A as recommendation groups 502, 504, and 506) are to appear. For example, the recommendation system 102 may indicate or otherwise order candidate application groups (as well as the recommendation group order) based on recommendation score or any other information (e.g., based on overall popularity of the applications that are members of the application group, locality to the user and/or user device 104-1, number of downloads of member applications of the candidate application groups, number of downloads of member applications of the candidate application groups that are recommended to the user, usage of similar applications to those identified by the candidate application groups, and/or the like).

Similarly, the recommendation data received either directly or indirectly from the recommendation system 102 may indicate the order (e.g., rank) that the application names for each recommendation group 502, 504, and 506 are to appear. For example, the recommendation system 102 may indicate or otherwise order applications in a manner similar to the candidate application groups (e.g., based on overall popularity of the applications that are members of the application group, locality to the user and/or user device 104-1, number of downloads of recommended applications, the user's usage of similar installed applications to those applications to be recommended, and/or the like). In some embodiments, the recommendation system 102 may order or rank applications based on an installation rate, number of active users, or other features (e.g., as tracked by the user device 104-1, recommendation system 102, digital distribution platform(s) 106, and/or any device).

The application recommendations may further enable a user to provide feedback regarding the recommended applications. For example, a user may provide feedback that the user does not like a specific application recommendation or an entire application group. As shown, the user is presented with a user interface element 508 that is associated with an application group 502. The user may select the user interface element 508 to provide feedback indicating that the user does not like the application group 502 as whole. Selecting the user interface element 508 may cause the user device to transmit feedback data to the recommendation system indicating that the user does not like the application group 502 associated with the user interface element 508. Further, in some embodiments, the application group 502, including each recommended application in the application group 502, may be removed from the display as a result of the user selecting the user interface element 508 associated with the application group 502.

The recommendation system 102 may, for the user or user device that selected user interface element 508, remove application groups associated with the removed application group. In some embodiments, the recommendation system 102 may filter (e.g., remove) candidate application groups identified in the future for that user based on the user's feedback. In various embodiments, the recommendation system 102 may not remove candidate application groups but may adjust a recommendation score of any number of candidate application groups based on the user's feedback.

The user may also be presented with a user interface element 510 that is associated with a single application within an application group 502 rather than the application group 502 as a whole. The user may select the user interface element 510 to provide feedback that the user does not like the single application recommendation associated with the user interface element 510 rather than the entire application group 502. Selection of the user interface element 510 associated with an application may cause the associated application to be removed from the listed application recommendations while the other application recommendations in the application group 502 remain presented to the user.

The recommendation system 102 may, for the user or user device that selected user interface element 508, chose not to recommend applications associated with the removed application (e.g., based on the user's selection of the user interface element 510). In some embodiments, the recommendation system 102 may filter (e.g., remove) applications identified in the future for that user based on the user's feedback. In various embodiments, the recommendation system 102 may choose not to recommend applications to the user that are similar (e.g., based on shared tags or shared categories) to the application the user choose to remove. Similarly, the recommendation system 102 may choose not to recommend applications to the user that are similar (e.g., based on shared tags or shared categories) to applications that the user uninstalled.

FIG. 5B shows application recommendations displayed in an icon format. As shown, the three application groups 502, 504 and 506, are listed from top to bottom along the display of the user device, however the application recommendations within each of the application groups 502, 504 and 506, are listed from left to right along the screen. A user may use a touch display of the user device to scroll up and down along the display to view the various application groups and scroll left and right to view the various application recommendations presented within each application group.

The applications may be presented in an icon format that is larger than the list format in which the application recommendations are presented in FIG. 5A. The larger icon format may allow for a greater amount of recommendation data to be presented and/or for the recommendation data to be presented at a larger size or font. The application recommendations may enable a user to access further recommendation data regarding the recommended applications and/or to download, purchase, preview, and/or the like, the recommended applications. For example, the application recommendations may be selectable to enable a user to access further recommendation data regarding the recommended application and/or download/purchase/preview the recommended application.

Further, the application recommendations may enable a user to provide feedback regarding the application groups and/or the application recommendations. For example, the user may be provided a user interface element 508 associated with an application group 502 that is selectable to enable the user to indicate that the user does not like the application group 502. Further, the user may be presented with a user interface element 510 that enables the user to provide feedback indicating that the user does not like a specific application within an application group 502 rather than the provide feedback regarding the application group 502 as a whole.

Figure 7:
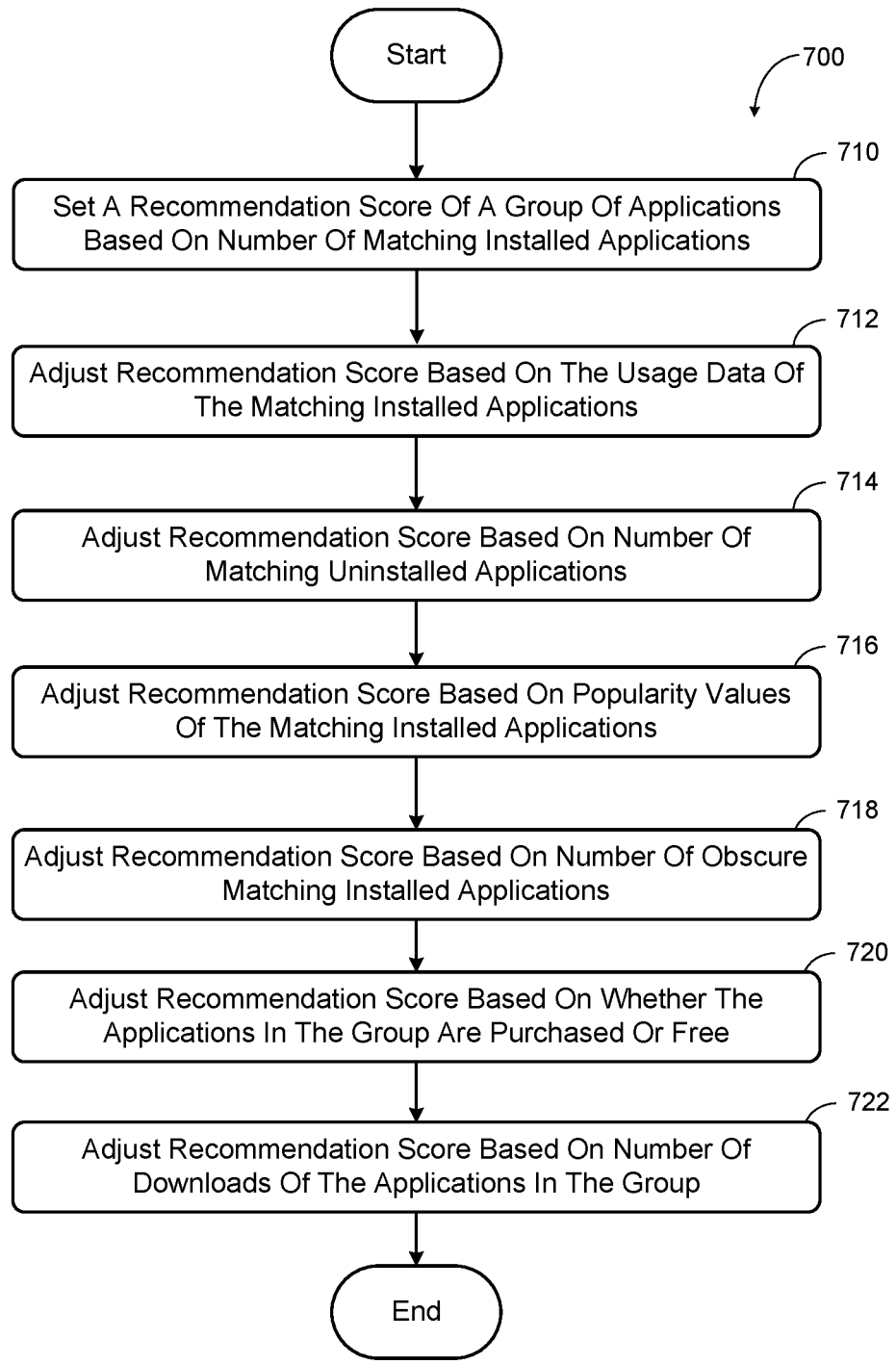
FIG. 7 is a flow chart illustrating an example method for calculating a recommendation score.

FIG. 7 illustrates an example method for calculating a recommendation score. At 710, the recommendation module 202 may set the recommendation score for a candidate application group based on the number of "matching applications" that are included in the candidate application group and are also installed on the user device 104-1. For example, the recommendation module 202 may compare the list of installed application identifiers to the list of application identifiers associated with an candidate application group to identify "matching application identifiers" that are included in the set of candidate application identifiers and the set of installed application identifiers (i.e., application identifiers installed on the user device 104-1). For each matching application identifier (i.e., installed application identifier that matches at least one of the candidate application identifiers from the list of candidate application identifiers), the recommendation module 202 may assign higher recommendation scores. The recommendation module 202 may assign higher recommendation scores to application groups determined to include a higher number of matching applications. Likewise, the recommendation module 202 may assign a lower recommendation score to application groups determined to include a lower number of matching applications.

At 712, the recommendation module 202 may adjust the recommendation score for a candidate application group based on the usage data for the matching applications in the candidate application group. For example, the recommendation module 202 may increase the recommendation score for a candidate application group based on each matching application included in the candidate application group that has a usage value (e.g., as indicated in the user data) that meets or exceeds a predetermined usage threshold level. Alternatively, the recommendation module 202 may decrease or not change the recommendation score for a candidate application group for each matching application in the candidate application group that has a usage level that is below a predetermined usage threshold level. As discussed herein, the usage value may include a value indicating that an application has been used, time of last use, frequency of use, duration of use, and/or the like. There may be any number of thresholds for each value and/or combination of values.

At 714, the recommendation module 202 may adjust the recommendation score of a candidate application group based on whether applications in the candidate application group have been uninstalled from the user device 104-1. The recommendation module 202 may compare a list of uninstalled application identifiers that identify applications that have been uninstalled from the user device 104-1 to the list of identifiers of applications that are members of any number of candidate application groups to determine if an application included in the candidate application group has been uninstalled from the user device 104-1. In some embodiments, a determination that the candidate application group includes an application that was uninstalled on the user device 104-1 may have a negative effect on the recommendation score of the candidate application group. For example, the recommendation module 202 may reduce and/or otherwise adjust the recommendation score of candidate application groups determined to include applications that have been uninstalled from the user device 104-1.

At 716, the recommendation module 202 may adjust a recommendation score of a candidate application group based on a popularity value of the matching applications included in the candidate application group. Applications that are popular and/or commonly downloaded may be a weak indicator regarding a user's preferences towards applications whereas unpopular or uncommon applications that are installed on the user device 104-1 may indicate a significant interest of the user and therefore may be a strong indicator of the user's preferences towards such applications. Accordingly, the recommendation module 202 may adjust (e.g., increase or decrease) the recommendation score of a candidate application group based on the popularity of the matching applications included in the candidate application group. In some embodiments, if a matching application has a low popularity value indicating that the application has not been downloaded by many users, the recommendation module 202 may increase the recommendation score for the candidate application group. If a matching application has a high popularity value indicating that the application has been downloaded by many users, the recommendation module 202 may reduce the recommendation score for the candidate application group.

At 718, the recommendation module 202 may be configured to adjust a recommendation score for a candidate application group containing an obscure application that is identified in the application installation information. For example, if the user has a relatively obscure application (e.g., uncommon and/or low popularity) that is used often and/or regularly by the user (e.g., as indicated by the user data), the recommendation module 202 may adjust the recommendation score of the candidate application group containing the obscure application. It will be appreciated that an obscure application that is used often and/or regularly may be a stronger indicator that similar applications (e.g., other applications that are members of the same application group as the obscure application) may be of interest to the user.

At 720, the recommendation module 202 may adjust the recommendation score for a candidate application group based on whether the matching applications were purchased or downloaded for free. For example, the recommendation module 202 may increase the recommendation score for each matching application included in the application group which was a paid application.

At 722, the recommendation module 202 may adjust the recommendation score for a candidate application group based on the number of downloads of member applications (e.g., the number of downloads being tracked by a digital distribution platform 106). For example, candidate application groups with a number or percentage of member applications that exceed a download threshold (e.g., the number of downloads of the applications meet or exceed a download threshold) may be scored higher or may have their recommendation score adjusted.

The method of FIG. 7 is an example method for calculating a recommendation score. Variations of the method 700 are contemplated. The ordering of the boxes in FIG. 7 is not mandatory. Further, some of the operations described with respect to the method are optional.

Figure 6:
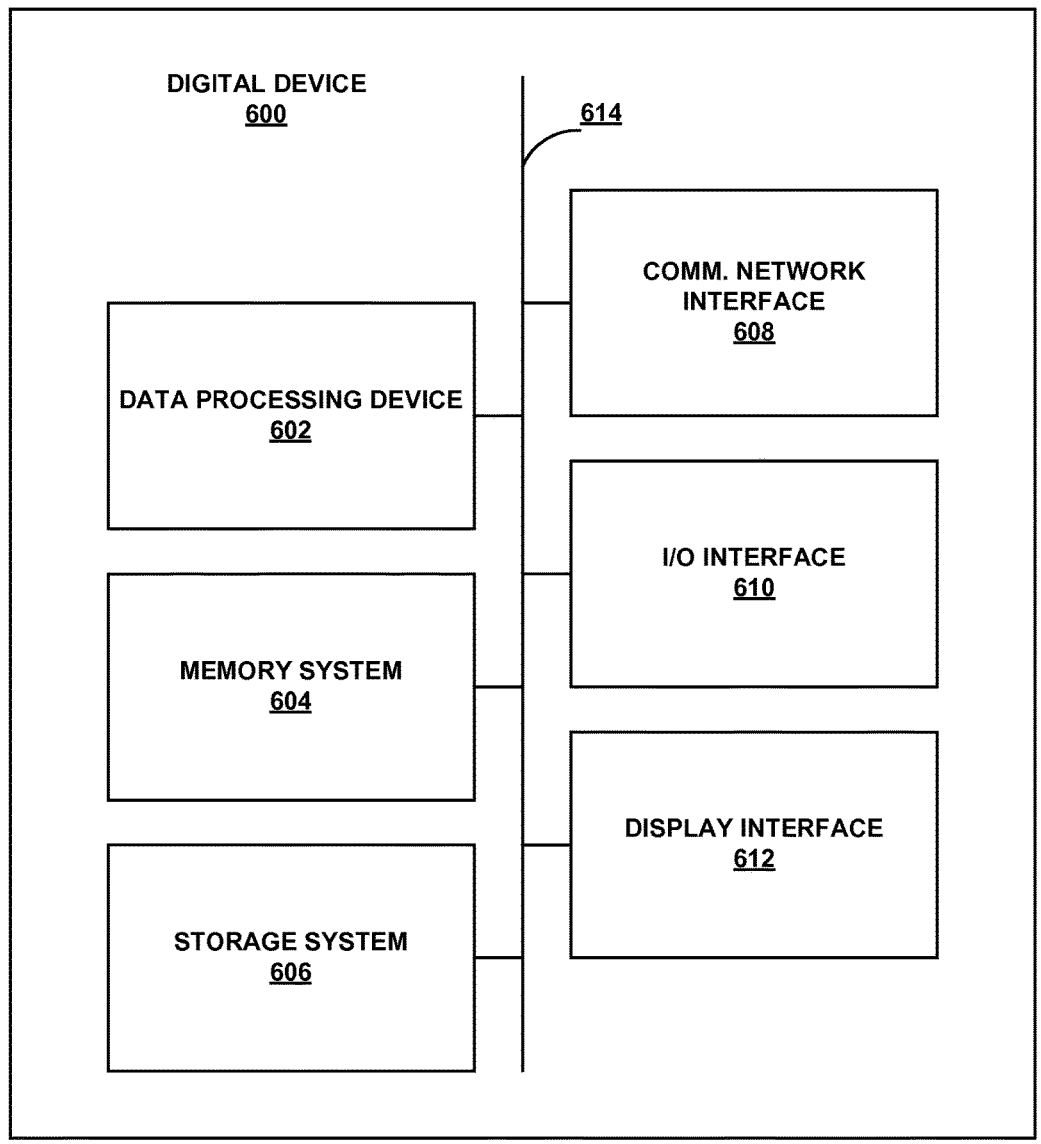
FIG. 6 is a functional block diagram of an example digital device.

FIG. 6 is a functional block diagram of an example digital device 600. The digital device 600 includes a data processing device 602 (e.g., a processor), a memory system 604 (e.g., non-transitory memory), a storage system 606, a communication network interface 608, an I/O interface 610, and a display interface 612 communicatively coupled to a bus. The data processing device 602 is in communication with the memory system 604, the storage system 606, the communication network interface 608, the I/O interface 610, and the display interface 612. The data processing device 602 is also configured to execute executable instructions (e.g., programs stored on the memory system 604 or the storage system 606). In some examples, the data processing device 602 includes circuitry or any data processing device capable of processing the executable instructions.

The memory system 604 is any non-transitory memory configured to store data. Some examples of the memory system 604 are storage devices, such as RAM or ROM. The memory system 604 may comprise the ram cache. The data within the memory system 604 may be cleared or ultimately transferred to the storage system 606.

The storage system 606 is any storage configured to retrieve and store data. Some examples of the storage system 606 are flash drives, hard drives, optical drives, and/or magnetic tape. The storage system 606 may comprise non-transitory media. In some implementations, the digital device 600 includes a memory system 604 in the form of RAM and a storage system 1206 in the form of flash data. Both the memory system 604 and the storage system 606 include computer readable media which may store instructions or programs that are executable by a computer processor including the data processing device 602.

The communication network interface (comm. network interface) 608 may be coupled to a network (e.g., network 108 of FIG. 1) via the link 614. The communication network interface 608 may support communication over an Ethernet connection, a serial connection, a parallel connection, or an ATA connection, for example. The communication network interface 608 may also support wireless communication (e.g., 802.11a/b/g/n, WiMax, 3G, 4G, LTE and the like). Moreover, the communication network interface 608 may support many wired and wireless standards.

The optional input/output (I/O) interface 610 is any device that receives input from the user and outputs data. The optional display interface 612 is any device that is configured to output graphics and data to a display. In some examples, the display interface 612 is a graphics adapter. While not all digital devices include either the I/O interface 610 or the display interface 612, the digital device 600 may include either, both, or none.

The hardware elements of the digital device 600 are not limited to those depicted in FIG. 6. A digital device 600 may comprise more or less hardware elements than those depicted. Further, hardware elements may share functionality and still be within various implementations described herein. In some examples, encoding and/or decoding may be performed by the data processing device 602 and/or a co-processor located on a graphics processing unit (GPU).

The above-described functions and components may be comprised of instructions that are stored on a storage medium such as a computer readable medium (e.g., a non-transitory computer readable medium). The instructions may be retrieved and executed by a data processing device. Some examples of instructions are software, program code, and firmware. Some examples of storage medium are memory devices, tape, disks, integrated circuits, and servers. The instructions are operational when executed by the data processing device to direct the data processing device to operate in accord with embodiments of the present disclosure. Those skilled in the art are familiar with instructions, data processing device(s), and storage medium.

The present disclosure is described above with reference to exemplary embodiments. It will be apparent to those skilled in the art that various modifications may be made and other embodiments may be used without departing from the broader scope of the present disclosure. Therefore, these and other variations upon the exemplary embodiments are intended to be covered by the present disclosure.

The invention claimed is:

1. A method comprising:
   maintaining, by a data processing device, a recommendation data store on a storage system, the recommendation data store storing a plurality of application group data records, each application group data record of the plurality of application group data records defining a group of applications represented by application identifiers of applications belonging to the group, each group of applications represented by the application identifiers in each application group data record of the plurality of application group data records being grouped based on one or more group generation rules, the group generation rules comprising instructions for inclusion of applications into application groups;
   receiving, by the data processing device, a recommendation request from a user device via a network, the recommendation request including a first set of installed application identifiers and a second set of uninstalled application identifiers, the first set of installed application identifiers being determined based on installed application information collected by the user device according to a command of a user or according to a predetermined schedule, the second set of uninstalled application identifiers being determined based on uninstalled application information collected by the user device according to a command of the user or according to a predetermined schedule, the installed application information identifying a set of applications that are installed on the user device, and the uninstalled application information identifying a set of applications that have been uninstalled from the user device;

identifying, by the data processing device, a set of one or more application group data records from the recommendation data store based on the first set of installed application identifiers, each identified application group data record including at least one application identifier that matches to at least one installed application identifier included in the recommendation request;

for each identified application group data record:
  determining, by the data processing device, a number of installed application identifiers from the first set that are also indicated in the identified application group data record,
  setting, by the data processing device, a recommendation score of the identified application group data record based at least in part on the number of matching application identifiers, the recommendation score comprising a numerical value,
  determining, by the data processing device, a subset of the uninstalled application identifiers in the second set that match one or more of the application identifiers in the application group data record, and
  in response to the subset of the uninstalled application identifiers in the second set including one or more application identifiers that match one or more application identifiers in the application group data record, adjusting, by the data processing device, the recommendation score of the identified application group data record to negatively affect the recommendation score;

selecting, by the data processing device, a first application group data record from the set of identified application group data records based on the recommendation score of the first application group data record;

selecting, by the data processing device, at least one non-matching application identifier from the first application group data record for inclusion in a set of recommended application identifiers, wherein the selected non-matching application identifier does not match any of the installed application identifiers of the first set or uninstalled application identifiers of the second set; and transmitting, by the data processing device, to the user device, recommendation data for at least one recommended application identified by the set of recommended application identifiers.

2. The method of claim 1, wherein the selecting the first application group data record comprises:
  comparing the recommendation score of the first application group data record to the recommendation score of at least a second application group data record of the set of identified application group data records; and
  determining that the recommendation score of the first application group data record is greater than the recommendation score of at least the second application group data record.

3. The method of claim 1,
wherein determining the number of matching application identifiers in each identified application group data record comprises:
  for each application identifier included in the application group data record that matches to at least one of the installed application identifiers received in the recommendation request:
    determining a usage value of an application corresponding to the matching application identifier, the usage value representing the usage of the application on the user device,
    determining whether the usage value for the corresponding application meets or exceeds a predetermined usage threshold, and
    in response to the usage value for the corresponding application meeting or exceeding the predetermined usage threshold, incrementing the number of matching application identifiers, and
  wherein, in response to the usage value for the corresponding application being less than the predetermined usage threshold, the matching application identifier is not counted towards the number of matching application identifiers.

4. The method of claim 1, wherein the set of recommended application identifiers does not include non-matching application identifiers corresponding to applications that have been uninstalled from the user device.

5. The method of claim 1, wherein selecting the first application group data record comprises:
  determining whether a geographic location of the user device is within a predetermined geographic range associated with a candidate application group data record; and
  selecting the candidate application group data record as the first application group data record in response to the geographic location of the user device being within the predetermined geographic range.

6. The method of claim 5, wherein selecting the first application group data record comprises preventing selection of the candidate application group data record as the first application group data record in response to the geographic location of the user device being outside the predetermined geographic range.

7. The method of claim 1, wherein determining the recommendation score for an application data record group comprises:
  determining an application popularity value of at least one application corresponding to a matching application identifier included in the application group data record of a candidate application group; and
  determining the recommendation score for the application group data record based on the application popularity value.

8. The method of claim 7, wherein the recommendation score for the candidate application group is affected positively in response to the application popularity value being below a predetermined threshold popularity value.

9. The method of claim 7, wherein the recommendation score for the candidate application group is affected negatively in response to the application popularity value being above a predetermined threshold popularity value.

10. A system comprising:
  a storage system that stores a recommendation data store, the recommendation data store storing a plurality of application group data records, each application group data record of the plurality of application group records defining a group of applications represented by application identifiers of applications belonging to the group, each group of applications represented by the application identifiers in each application group data record of the plurality of application group data records being grouped based on one or more group generation rules, the group generation rules comprising instructions for inclusion of applications into application groups; and a data processing device in communication with the recommendation data store, the data processing device executing a set of computer-executable instructions, the computer-executable instructions, when executed by the data processing device, cause the data processing device to:
receive a recommendation request from a user device via a network, the recommendation request including a first set of installed application identifiers and a second set of uninstalled application identifiers, the first set of installed application identifiers being determined based on installed application information collected by the user device according to a command of a user or according to a predetermined schedule, the second set of uninstalled application identifiers being determined based on uninstalled application information collected by the user device according to a command of the user or according to a predetermined schedule, the installed application information identifying a set of applications that are installed on the user device, and the uninstalled application information identifying a set of applications that have been uninstalled from the user device,
identify a set of one or more application group data records from the recommendation data store based on the first set of installed application identifiers, wherein each identified application group data record includes at least one application identifier that matches to at least one installed application identifier included in the recommendation request,
for each identified application group data record:
determine a number of installed application identifiers from the first set that are also indicated in the identified application group data record;
set a recommendation score of the identified application group data record based at least in part on the number, wherein the recommendation score is a numerical value;
determine a subset of the uninstalled application identifiers in the second set match one or more of the application identifiers in the application group data record; and
in response to the subset of the uninstalled application identifiers in the second set including one or more application identifiers that match one or more application identifiers in the application group data record, adjust the recommendation score of the identified application group data record to negatively affect the recommendation score;
select a first application group data record from the set of identified application group data records based on the recommendation score of the first application group data record,
select at least one non-matching application identifier from the first application group data record for inclusion in a set of recommended application identifiers, wherein the selected non-matching application identifier does not match any of the installed application identifiers of the first set or uninstalled application identifiers of the second set, and
transmit, to the user device, recommendation data for at least one recommended application identified by the set of recommended application identifiers.

11. The system of claim 10, wherein selecting the first application group data record comprises:

comparing the recommendation score of the first application group data record to the recommendation score of at least a second application group data record of the set of application group data records; and
determining that the recommendation score of the first application group data record is greater than the recommendation score of at least the application group data record.

12. The system of claim 10, wherein determining the number of matching application identifiers in each identified application group data record comprises:
for each application identifier included in the application group data record that matches to at least one of the installed application identifiers received in the recommendation request:
determining a usage value of an application corresponding to the matching application identifier, the usage value representing the usage of the application on the user device;
determining whether the usage value for the corresponding application meets or exceeds a predetermined usage threshold; and
in response to the usage value for the corresponding application meeting or exceeding the predetermined usage threshold, incrementing the number of matching application identifiers, and
wherein, in response to the usage value for the corresponding application being less than the predetermined usage threshold, the matching application identifier is not counted towards the number of matching application identifiers.

13. The system of claim 10, wherein the set of recommended application identifiers does not include non-matching application identifiers corresponding to applications that have been uninstalled from the user device.

14. The system of claim 10, wherein selecting the first application group data record comprises:
determining whether a geographic location of the user device is within a predetermined geographic range associated with a candidate application group data record; and
selecting the candidate application group data record as the first application group data record in response to the geographic location of the user device being within the predetermined geographic range.

15. The system of claim 14, wherein selecting the first application group data record comprises:
preventing selection of the candidate application group data record as the first application group data record in response to the geographic location of the user device being outside the predetermined geographic range.

16. The system of claim 10, wherein determining the recommendation score for an application group data record comprises:
determining an application popularity value of at least one application corresponding to a matching application identifier included in the application group data record of a candidate application group; and
determining the recommendation score for the application group data record based on the application popularity value.

17. The system of claim 16, wherein the recommendation score for the candidate application group is affected positively in response to the application popularity value being below a predetermined threshold popularity value.

18. The system, of claim 16, wherein the recommendation score for the candidate application group is affected negatively in response to the application popularity value being above a predetermined threshold popularity value.

* * * * *